Jan. 19, 1943.   G. H. KOCH   2,308,609

SELF-ALIGNING BEARING

Filed July 6, 1940

WITNESSES:
R. J. Eisinger
A. J. Cook

INVENTOR
GUSTAV H. KOCH
BY Walteiger
ATTORNEY

Patented Jan. 19, 1943

2,308,609

UNITED STATES PATENT OFFICE 2,308,609

SELF-ALIGNING BEARING

Gustav H. Koch, Springfield, Mass., assignor to Westinghouse Electric & Manufacturing Company, East Pittsburgh, Pa., a corporation of Pennsylvania Application July 6, 1940, Serial No. 344,195

4 Claims. (Cl. 308—72)

My invention relates to a self-aligning bearing and means for supporting and retaining the same in such manner as to permit rotary movement of the bearing into aligned position. More particularly, the invention relates to a resilient retaining member for retaining a self-aligning bearing against its spherical seat.

One difficulty that has been encountered in connection with spring retainers or resilient pressure means for holding self-aligning bearings in their spherical seats is occasional binding of the shaft due to displacement of the bearing from aligned position in some unaccounted for manner. This effect is noticed most frequently in very small motors which have insufficient starting torque to overcome the added friction introduced by such misalignment, for example, electric fan motors.

The difficulty just mentioned is absent in rigidly clamped self-aligning bearings. Rigid clamping means, on the other hand, are subject to a tendency to loosen and cause bearing rattle.

It is an object of my invention to provide improved supporting and retaining means for self-aligning bearings.

A particular object is to avoid binding of the shaft carried by a self-aligning bearing.

A further object is to provide a supporting and retaining means for a self-aligning bearing which will permit the bearing readily to rotate into aligned position and to remain in such aligned position.

A further object is to provide supporting and retaining means for self-aligning bearings which facilitates manufacture and assembly thereof.

I have devised a supporting and retaining means comprising a spring-retaining member which overcomes the difficulty set forth above and effects the above-mentioned objects, and a full description of which follows.

These and other objects are effected by my invention as will be apparent from the following description and claims taken in connection with the accompanying drawing, forming a part of this application, in which:

Figure 1:
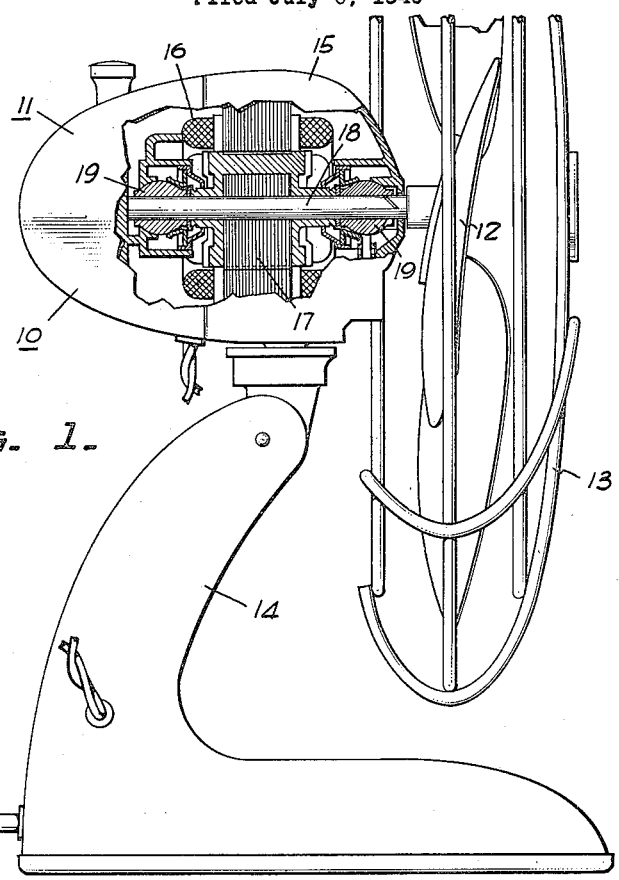
Fig. 1 is a side elevation of an electric fan with the bearings and parts of the motor shown in section.

The present invention is particularly applicable to an electric motor of low torque, such as an electric fan motor. Accordingly, I show my invention in connection with an electric fan indicated generally by the reference numeral 10, and comprising an electric motor 11, a fan 12 driven thereby, a fan guard 13, and a base or supporting member 14. The electric motor 11 includes a motor housing 15, a stator 16, an armature 17 mounted on a shaft 18, and self-aligning bearings 19 in which the shaft is journaled. Except for the bearings and the supporting and retaining means therefor, the electric motor may be of conventional construction.

Each bearing 19 is formed with a spherical outer surface 21. The housing 15, or other supporting structure carried thereby, is provided with a cylindrical flange 22 having a spherical surface seat 23 which receives the bearing 19 and which is formed to contact the cylindrical surface 21 thereof. The housing is also formed with a cylindrical wall member 24 and a connecting wall portion 25 to form an annular chamber 26 about the bearing. The end portions of the bearing 19 may have cylindrical surfaces 30, as shown. At the end remote from the seat 23, the bearing is formed with a conical surface 29 which is tangent to the spherical surface 21 and which extends from the latter to the cylindrical surface 30.

Figures 2, 3, 4:
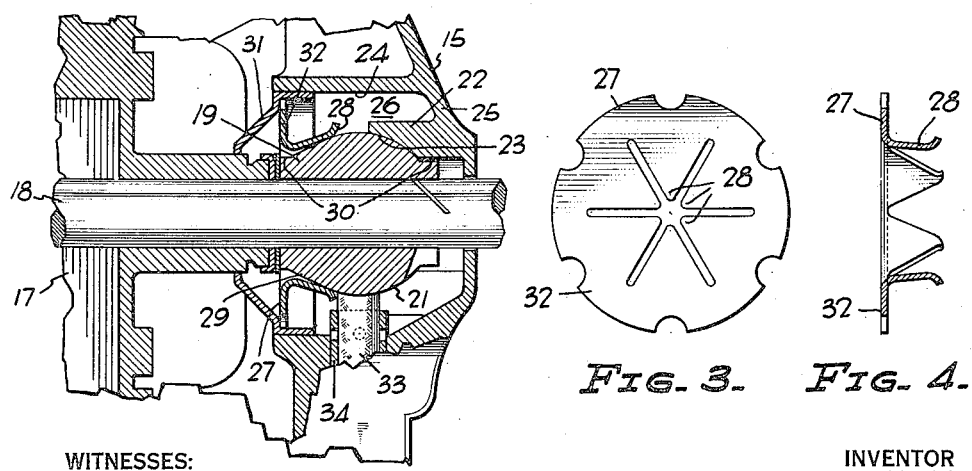
Fig. 2 is an enlarged sectional view showing one of the bearings.
Fig. 3 is an elevational view of the blank from which the bearing retainer is made; and, Fig. 4 is a sectional view of the bearing retainer with the spring fingers bent to project therefrom.

In accordance with the present invention, I provide an improved retaining member for holding the bearing in the spherical seat 23. This retaining member 27 is made from a circular blank shown in Fig. 3. This blank is formed with six segment-shaped spring fingers 28, the pointed outer or free ends of which are disposed adjacent the center of the blank. These fingers are then bent substantially at right angles to the plane of the blank, as shown in Fig. 4, with the outer or free end portions curved as shown. This retaining member is telescoped over the end of the bearing remote from the seat 23, the spring fingers 28 being spread apart by engagement with the conical surface 29 of the bearing. In the assembled position, however, the spring fingers 28 contact the spherical surface 21 at points to the left of the center of the bearing as shown in Fig. 2.

The flat outer portion 32 of the member 27 is disposed adjacent the end of the bearing, as shown in Fig. 2, the fingers extending in a generally axial direction toward the spherical seat. The retaining member is maintained in position in any suitable manner, for example, by means of a cupped member 31 which is either driven or pressed into engagement with the inner surface of the cylindrical wall 24, as shown in Fig. 2.

The spring fingers 28 are resilient transversely thereof and are substantially rigid longitudinally thereof. The transverse spring force acts radially on the spherical surface of the bearing, and holds the bearing against the seat 23. It also produces friction between the spring fingers and the bearing which yieldingly resists rotation of the latter.

I have found that a bearing and supporting means therefor constructed as shown and described herein has a high degree of freedom from binding. This is thought to be due to the following reason: Upon rotative movement of the bearing toward aligned position, the friction force imposed on the spring fingers 28 acts longitudinally of the latter, which is the direction of maximum rigidity. Accordingly, there is not built up in the spring fingers a spring force which would bias the bearing back into misaligned position. Instead, there is relative sliding between the spherical surface and the spring fingers, so that, when it is moved into aligned position, the spring fingers tend to hold the bearing in such aligned position in a stable manner. The outer annular portion 32 is sufficiently rigid so that no spring force is built up therein upon rotative movement of the bearing.

It will be noted that I have provided a simple construction which may be easily assembled. A further advantage is that it provides a space, such as the chamber 26, in which suitable provision for lubrication may be made. In the illustrated embodiment, a wick 33 extends through a tube 34 into contact with the bearing 19, which is preferably made of a porous bearing material.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A self-aligning bearing comprising a bearing member having a convex spherical surface and a journal bearing surface, a supporting member having a concave spherical surface adapted to engage said spherical surface at one end of the bearing, and a retaining member at the other end of the bearing member, said retaining member comprising resilient prongs extending substantially axially from the end of the bearing toward the center thereof and contacting the spherical surface substantially tangentially and biasing the bearing in a direction substantially perpendicular to the prong and radial of the bearing, whereby the retaining member biases the bearing member yieldingly against the support member and retains it frictionally and yieldingly but not resiliently against rotation.

2. In a self-aligning bearing, the combination of a bearing member having a convex spherical surface and having a shaft opening extending through the same, a rigid supporting member having a concave spherical surface seat engaging a portion of the spherical surface of the bearing member adjacent one end of said shaft opening, and a bearing retaining member comprising a sheet metal disk disposed adjacent the other end of said shaft opening and normal to the axis thereof, said sheet metal disk having spring fingers struck out from the central portion thereof and bent to extend from the disk in a generally axial direction toward said spherical surface seat, the free ends of said spring fingers contacting said spherical surface of said bearing member substantially tangentially and biasing the bearing in a direction substantially perpendicular to the spring fingers and radial to the bearing, the points of contact being disposed on the side of the middle or center of the bearing opposite from said seat, whereby the retaining member biases the bearing member yieldingly against the spherical surface seat and retains it frictionally and yieldingly but not resiliently against rotation.

3. A self-aligning bearing as set forth in claim 2, wherein said bearing member is formed with a conical surface around said other end of said shaft opening for spreading said spring fingers upon assembly.

4. In a self-aligning bearing, the combination of a bearing member having a convex spherical surface and having a shaft opening extending through the same, a rigid supporting member having a concave spherical surface seat engaging a portion of the spherical surface of the bearing member adjacent one end of said shaft opening, said supporting member also having a wall encompassing said bearing member and at least a portion of said wall being disposed in spaced relation to said bearing member to provide a chamber for accommodating a lubricating wick or the like, and a bearing retaining member comprising a sheet metal disk supported by said wall adjacent the other end of said shaft opening and normal to the axis thereof, said sheet metal disk having spring fingers struck out from the central portion thereof and bent to extend from the disk in a generally axial direction toward said spherical surface seat, the free ends of said spring fingers contacting said spherical surface of said bearing member substantially tangentially and biasing the bearing in a direction substantially perpendicular to the spring fingers and radial to the bearing, the points of contact being disposed on the side of the middle or center of the bearing opposite from said seat, whereby the retaining member biases the bearing member yieldingly against the spherical surface seat and retains it frictionally and yieldingly but not resiliently against rotation.

GUSTAV H. KOCH.